United States Patent [19]

Chattha et al.

[11] Patent Number: 5,021,389

[45] Date of Patent: * Jun. 4, 1991

[54] THREE-WAY CATALYST FOR AUTOMOTIVE EMISSION CONTROL AND METHOD OF MAKING THE CATALYST

[75] Inventors: Mohinder S. Chattha, Northville, Mich.; William L. H. Watkins, Toledo, Ohio; Haren S. Gandhi, Farmington Hills, Mich.

[73] Assignee: Ford Motor Company, Dearborn, Mich.

[ * ] Notice: The portion of the term of this patent subsequent to Feb. 12, 2008 has been disclaimed.

[21] Appl. No.: 440,578

[22] Filed: Nov. 22, 1989

[51] Int. Cl.$^5$ .................. B01J 21/04; B01J 21/06; B01J 23/10; B01J 23/44

[52] U.S. Cl. ................... 502/303; 423/213.5

[58] Field of Search .................. 502/303; 423/213.5

[56] References Cited

U.S. PATENT DOCUMENTS

| | | | |
|---|---|---|---|
| 4,123,391 | 10/1978 | Noguchi et al. | 252/466 PT |
| 4,283,308 | 8/1981 | Ohara et al. | 252/435 |
| 4,350,613 | 9/1982 | Nishino et al. | 252/455 R |
| 4,504,598 | 3/1985 | Ono et al. | 502/303 |
| 4,624,941 | 11/1986 | Berndt et al. | 502/302 |
| 4,650,782 | 3/1987 | Onal | 502/339 |
| 4,791,091 | 12/1988 | Bricker et al. | 502/303 |
| 4,868,148 | 9/1989 | Henk et al. | 502/327 X |

*Primary Examiner*—W. J. Shine
*Attorney, Agent, or Firm*—Joseph W. Malleck; Roger L. May

[57] ABSTRACT

A three-way catalyst for automotive emission control having a mechanical carrier having a support comprised substantially of alumina, a lanthanum oxide coating decorated onto the support, a catalytic compound discontinuously supported on the decorated support having a major constituent of palladium, and a discontinuous phase of titanium oxide on the alumina, lanthana, and catalytic compound composite.

The method of making such three-way catalyst for automotive emission control, comprises coating an alumina support with lanthana, impregnating the coated support with a palladium compound to form a discontinuous phase on the lanthana, and impregnating the coated support and catalytic compound with an organotitania compound to form a discontinuous phase on the lanthana and palladium compound.

14 Claims, 3 Drawing Sheets

2

THREE-WAY CATALYST FOR AUTOMOTIVE EMISSION CONTROL AND METHOD OF MAKING THE CATALYST

BACKGROUND OF THE INVENTION

1. Technical Field

This invention relates to the art of making catalysts for treating automotive emissions, and more particularly to three-way catalysts that have high conversion efficiency for hydrocarbons, carbon monoxide, and nitrogen oxides.

2. Discussion of the Prior Art

Precious metals, including palladium, have been used as active catalyst materials in automotive emission devices. However, palladium, by itself, as the dominant or sole catalyst material, is limited in its effectiveness to promote the reduction of nitrogen oxide compounds at high temperatures and is not optimum in promoting oxidation of hydrocarbons at such temperatures. An example of such palladium usage is disclosed in U.S. Pat. No. 4,123,391. A variety of cost-increasing alternatives have been used to augment the capabilities of palladium, primarily by the use of other precious metals.

This invention has discovered that small amounts of titania (a nonprecious metal) uniquely applied will synergistically cooperate with lanthanum oxide in the presence of Pd to enhance the total catalytic effect for oxidation and reduction, particularly at very low temperatures and at very high temperatures. Titania has not been used heretofore as a catalyst enhancing ingredient nor have titania and lanthanum oxide been used together as catalyst enhancing ingredients. Titania has been incorporated in catalyst support materials for purposes of stabilizing such support materials, but prevented from entering into the catalytic process by coverings of other catalytically active ingredients (see U.S. Pat. Nos. 4,504,598 and 4,123,391). In some cases, titania has been layered on the support in large amounts prior to being covered with the catalytically active material (see U.S. Pat. No. 4,350,613).

Straight titania has been slurried onto prevalent precious metal materials (including palladium) in a continuous film (of about 0.003-0.01 inches) to make an oxidation catalyst more lead tolerant (see U.S. Pat. No. 4,650,782). Such catalyst construction was not intended for enhancement of reduction processes, the titania did not function as a reducing catalyst, and there was found no special catalytic synergism between titania and palladium.

Lanthanum oxide has been suggested for use as a substrate stabilizer as well as other rare earth oxides (see U.S. Pat. Nos. 4,624,941 and 4,283,308). In such disclosures, lanthanum oxide is dispersed as a sintered powder onto a substrate support such as alumina; the lanthanum oxide and support together are then covered with one or more noble metals. No improvement in catalytic activity was attributed to the presence of $La_2O_3$. U.S. Pat. No. 4,791,091 found that by dispersing lanthanum oxide onto $Al_2O_3$ in small particle size assisted the activity of rhodium in the temperature range of 200°-460° C., but failed to appreciate how lanthanum oxide could be used to increase catalytic activity of palladium at temperatures below 200° C. and above 460° C.

SUMMARY OF THE INVENTION

This invention is a three-way catalyst construction, including its method of making, which deploys titania and lanthanum oxide together in a unique manner.

The three-way catalyst construction for automotive emission control comprises: (a) a mechanical carrier having a support comprised substantially of alumina; (b) discontinuous lanthanum oxide on the support; (c) a catalytic compound supported discontinuously on the decorated support having a major constituent of palladium; and (d) a discontinuous phase of titanium oxide on the lanthana, catalytic compound, and $Al_2O_3$ composite.

"Support" is used herein to mean a material having a high surface area per unit volume and a good adhesion for precious metal applied thereto; "carrier" is used herein to mean a material having a low surface area per unit volume and a poor adhesion to precious metals if applied thereto; "catalyst" or "catalyst construction" is used to mean the aggregation of support, lanthana, catalytic compound, and titania, but excluding the carrier.

Preferably, alumina particles are precipitated from an alumina slurry, and such particles should be present in the catalyst construction in an amount of at least 50% (by weight). Lanthana is preferably precipitated from lanthanum nitrate and should be present in the catalyst in an amount of 2-30% (by weight). Preferably, palladium is precipitated from palladium nitrate and is present in an amount of .0.05-5% of the total weight of the catalyst; such catalytic compound (palladium) may contain platinum up to 2.5% of the compound. Preferably, the discontinuous titania phase is formed from an organo-titanate and the titania will constitute up to 8% of the total weight of the catalyst; no greater than 40% of the surface area of each exposed particle of the catalytic compound, lanthana, or support is covered by the discontinuous phase of titanium oxide.

The method of this invention comprises: (a) discontinuously coating an alumina support with lanthana; (b) impregnating the coated support with a palladium compound to form a discontinuous phase on the lanthana and support; and (c) impregnating the coated support and catalytic compound with an organo-titanium compound to form, upon heating, a discontinuous titania phase on the discontinuous lanthana and palladium compound phases. Discontinuity of lanthana is achieved by precipitation of a crystalline compound from an inorganic solution, which crystalline compound inherently fails to continuously spread across the alumina. Maximum dispersement on the alumina is achieved up to 15% by weight $La_2O_3$; lanthana will spread out as the islands of lanthana build up when the content exceeds 15%. Such island build-up leads to less surface area for interaction with Pd. As lanthana is controlled to 15% or less, the build-up is of a two-dimensional character with minimal spreading.

Discontinuity of palladium is achieved for a similar reason by precipitation as an inorganic crystalline phase.

Discontinuity of titania is achieved by adding titanium as an organo-titanium compound and decomposing such compound by heat to form the discontinuity. Preferably, the organo-titanium compound is titanium butoxide and is dissolved in a liquid for wetting the composite, the wetted composite being calcined at a temperature of 400°-600° C. for 4-12 hours. Such calcination is staged to include heating to 250°-280° C. for 1-½ to 2-½ hours and thence heating to 400°-600° C. for 5-10 hours.

DETAILED DESCRIPTION AND BEST MODE

Figure 1:
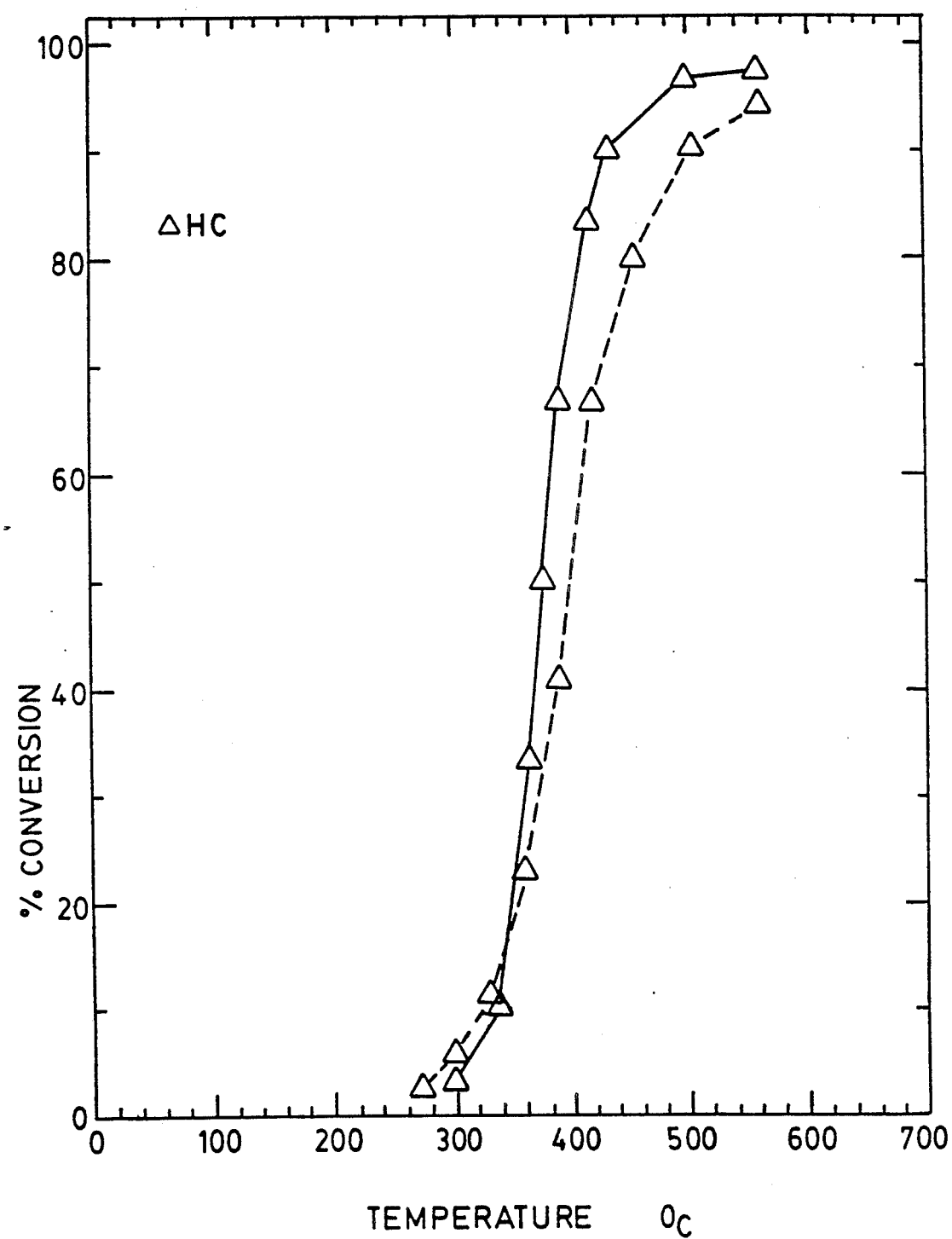
FIG. 1 is a graphical illustration of hydrocarbon conversion efficiency plotted as a function of temperature for (i) a catalyst construction in accordance with this invention and (ii) for a typical prior art construction lacking the titania improvement.

The three-way catalyst of this invention consists essentially of a mechanical carrier having a support comprised substantially of alumina, a lanthanum oxide deposit on the support, a catalytic palladium compound dispersed thereover, and titania deposited discontinuously on the palladium/lanthana support composite.

The mechanical carrier is preferably comprised of a monolithic silicate structure (i.e., cordierite), although the configuration of which is not critical to the catalyst of this invention. The volume of the structure is measured by its exterior dimensions. It is preferred that the micropore volume of the silicate material be relatively low and the macropore volume provide at least about 90% with pore diameters greater than 2000 angstroms. The surface area of the carrier, as opposed to the material of which the structure is made, should be maximized consistent with pressure drop limitations for the particular application of the catalytic system of this invention. It is preferred that the surface area of the monolithic structure provide 50-1000m$^2$ per liter of structure, as measured by N$_2$ adsorption. Cell density should be maximized consistent with pressure drop limitations and is preferably in the range of 200-800 cells per square inch of cross-sectional area of the structure.

Alumina must be the dominant or substantial ingredient of the support (at least 50% by weight) because it has high surface area, good adhesion, and low precious metal/support chemical interaction. It is desirable to form a support slurry by adding a solution of lanthanum nitrate in water to alumina particles—gamma or alpha type. Lanthanum oxide decorated Al$_2$O$_3$ particles are formed upon drying (12 hours at 110° C.) and calcination (at about 700° C. for 16 hours) from such slurry. The crystalline lanthana will not form a continuous coating, but rather pockets of separated particles or patches of lanthana. The alumina particles for the support may be prepared as a collection of aggregates by (i) wetting a particulate source of alumina with dilute nitric acid to form a slurry, (ii) drying the slurry to form a cake, and (iii) crushing the cake to an average particle size of 24-40 mesh.

The Particles of such drying and calcination will then receive the discontinuous phases of palladium and titanium oxide to form a collection of specially decorated Particles which are eventually applied as a washcoating to the carrier or monolithic structure heretofore described. This is carried out by forming a diluted solution of palladium nitrate (containing about 8 grams/liter of palladium) and adding the lanthana decorated alumina particles; the mixture is dried (for about 12 hours at about 110° C.) and calcined (for about 16 hours at about 650° C.) to produce discontinuously decorated Pd/La$_2$O$_3$ alumina composition. This composition is then impregnated with titanium butoxide dissolved in ethanol, dried at about 100° C. for about 12 hours and then stage-heated to be calcined.

The specially decorated TiO$_2$/Pd/La$_2$O$_3$ alumina particles can be deposited on the monolithic carrier by any conventional or convenient means. Typical of such means is dipping the carrier in a slurry of such speciallY decorated particles to form a deposit in the form of a film of about 0.0003-0.01 inch thick. It is also preferred that such deposited particles be present on the monolithic support in an amount ranging from about 400 to about 10,000 grams per cubic foot of carrier, where the volume is measured by the exterior dimensions of the monolithic carrier.

Alternatively, lanthana and palladium may be applied directly to an alumina coated monolith structure as a first coating and the discontinuous phase of titanium oxide applied over the palladium.

The catalytic compound of the present invention must comprise a major constituent of palladium which in turn is supported on the lanthana/alumina substrate. Palladium is present in an amount of at least 55% by weight of the catalytic compound. Platinum may be present in such compound in an amount up to 45% (preferably up to 2.5% by weight) and may include other components which act as stabilizers and/or interspersants, which are well known in the art. Additionally, other components known to be beneficial to the oxidation of automotive exhaust gases may be present in minor amounts in the catalyst of the instant invention such as CaO, Zr$_2$O$_3$, NiO, and Fe$_2$O$_3$.

The discontinuous palladium phase is achieved by crystal impregnation of palladium from palladium compounds in solution that have been calcined. The discontinuous phase consists of titanium oxide; titanium dioxide is intended to mean herein primarily the stable oxide form of TiO$_2$, but other forms, such as TiO, Ti$_2$O$_3$, Ti$_3$O$_5$, and Ti$_2$O may be present in minor proportions of less than 2%. Titanium oxide may constitute from 0.1% up to 8% of the total weight of the catalyst (preferably 0.1-2.% of the total weight of the catalyst). Discontinuous titania phase means that the phase covers no greater than 40% and preferably 2-20% of the exposed surface of the catalytic compound. If TiO$_2$ is present in an amount greater than 8% by weight, the phase starts to display continuous regions and conversion efficiency is seriously affected. If present in an amount less than 0.1% by weight, the ability of TiO$_2$ to supply oxygen to Pd is unnoticeable and again affects conversion efficiency.

The method of making the three-way catalyst comprises: (a) decorating an alumina support with lanthana; (b) impregnating the decorated support with a palladium compound to form a discontinuous phase on the lanthana/alumina; and (c) impregnating the composite of decorated support and palladium with an organotitanium compound to form, upon heating, a discontinuous titanium oxide phase on the exposed portions of such composite.

To decorate the alumina support, it is impregnated with a solution of lanthanum compounds (e.g., lanthanum nitrate), then dried and calcined to crystallize lanthana. The decorated support is impregnated with palladium by wetting the decorated support with a solution of palladium compound (e.g., palladium nitrate), and then dried and calcined to crystallize a discontinuous phase of palladium.

Palladium may be enhanced in catalytic activity by (i) control of the particle size for a systemic difference, and (ii) by adding palladium in a diluted palladium nitrate solution with the amount of acid being regulated to achieve pH of 3-5 and thereafter after drying the support, wetted with such acid, and calcining the composite at a temperature in the range of 400°-650° C.

The organo-titanium compound is applied by dissolving such compound in a liquid for wetting the alumina/lanthanum/palladium composite, the wetted composite being then calcined at a temperature of about 400°-600° C. for 4-12 hours. Preferably, the calcination is staged to include heating to 250°-280° C. for 1-½ to 2-½ hours, and thence heating to 400°-600° C. for 5-10 hours.

The organo-titanium compound is selected from the group consisting of organo-titanates. A preferred example of such compound is butoxide, characterized by $Ti(OC_4H_9-n)_4$. Equivalents to butoxide are titanium alkoxides. Organo-titanium compounds, particularly titanium butoxide, decompose at lower temperatures, substantially below the decomposition temperature of palladium nitrate.

Figure 3:
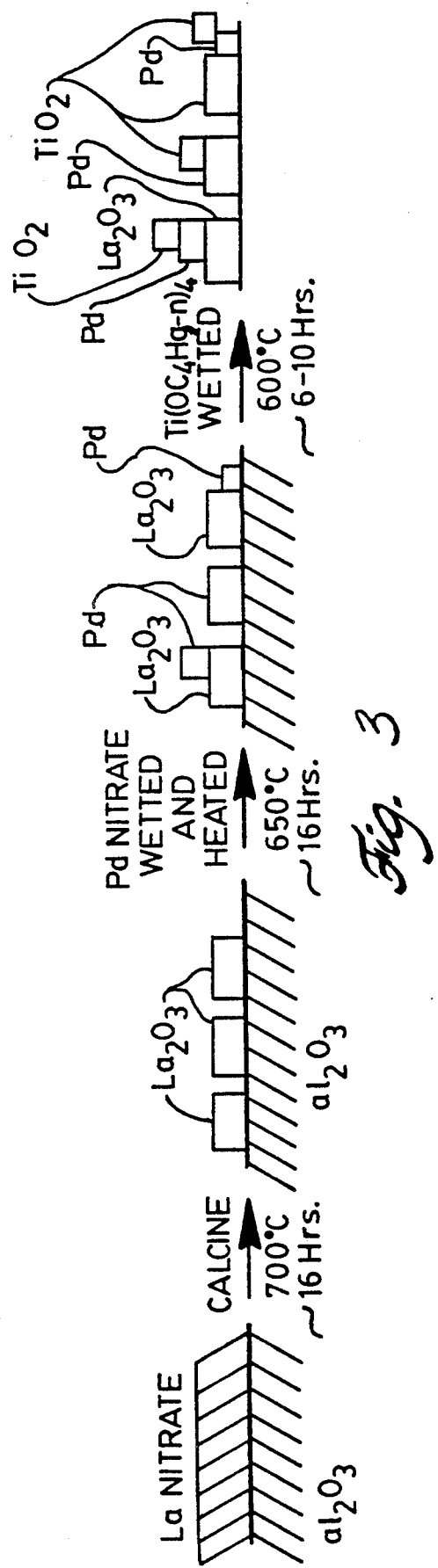
FIG. 3 is a schematic representation of the titania palladium, lanthana deposit relationship.

As shown in FIG. 3, the discontinuous phases of the composite represent a striking physical difference to that of the prior art. Titania covers no greater than 40% of the surface area of the exposed and separated palladium/lanthana particles. Heating lanthanum nitrate wetted alumina is the separated crystallites of lanthana; heating palladium nitrate wetted lanthana/alumina produces crystallites of palladium on or about the lanthana or alumina. Wetting the discontinuous crystallites of Pd and the decorated alumina/lanthana with an organo-titanium compound, followed by heating, results in growing of $TiO_2$ on or adjacent to the Pd particles. Titania crystallites will not grow preferentially independent of the Pd. Irregularities in the gamma alumina substrate, such as exposed crystallographic planes, contamination layers, or roughness due to geometry of nucleation sites, decrease the interfacial strength between Pd and gamma alumina and promote even greater discontinuities of the Pd particles.

The amount of organo-titanium compound introduced to the catalyst must be in the operational range of 0.1-8% by weight of the total catalyst, and preferably 0.1-2.0%. If the titanium compound were to be less than 0.1% of the total catalyst, there would be an imperceptible amount of enhancement of the catalytic activity. If the titanium compound were to exceed 8%, the catalytic activity of palladium would be retarded by masking of a greater percentage of the palladium and thus reducing its exposure.

The titania compound functions as a catalyst in combination with palladium and lanthana to aid in reduction as well as oxidation of the gases within the automotive emissions. The titanium oxide in its discontinuous configuration functions during oxygen-lean conditions of the emission gas to form di-titanium trioxide and additional oxygen. This may be represented by the equation:

$$2TiO_2 \rightarrow Ti_2O_3 + \tfrac{1}{2} O_2.$$
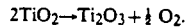

During rich oxygen spikes of the emission gas, a reducing condition occurs where titanium trioxide combines with oxygen to form titanium dioxide represented by the formula:

$$Ti_2O_3 + \tfrac{1}{2} O_2 \rightarrow 2TiO_2.$$
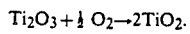

Figure 2:
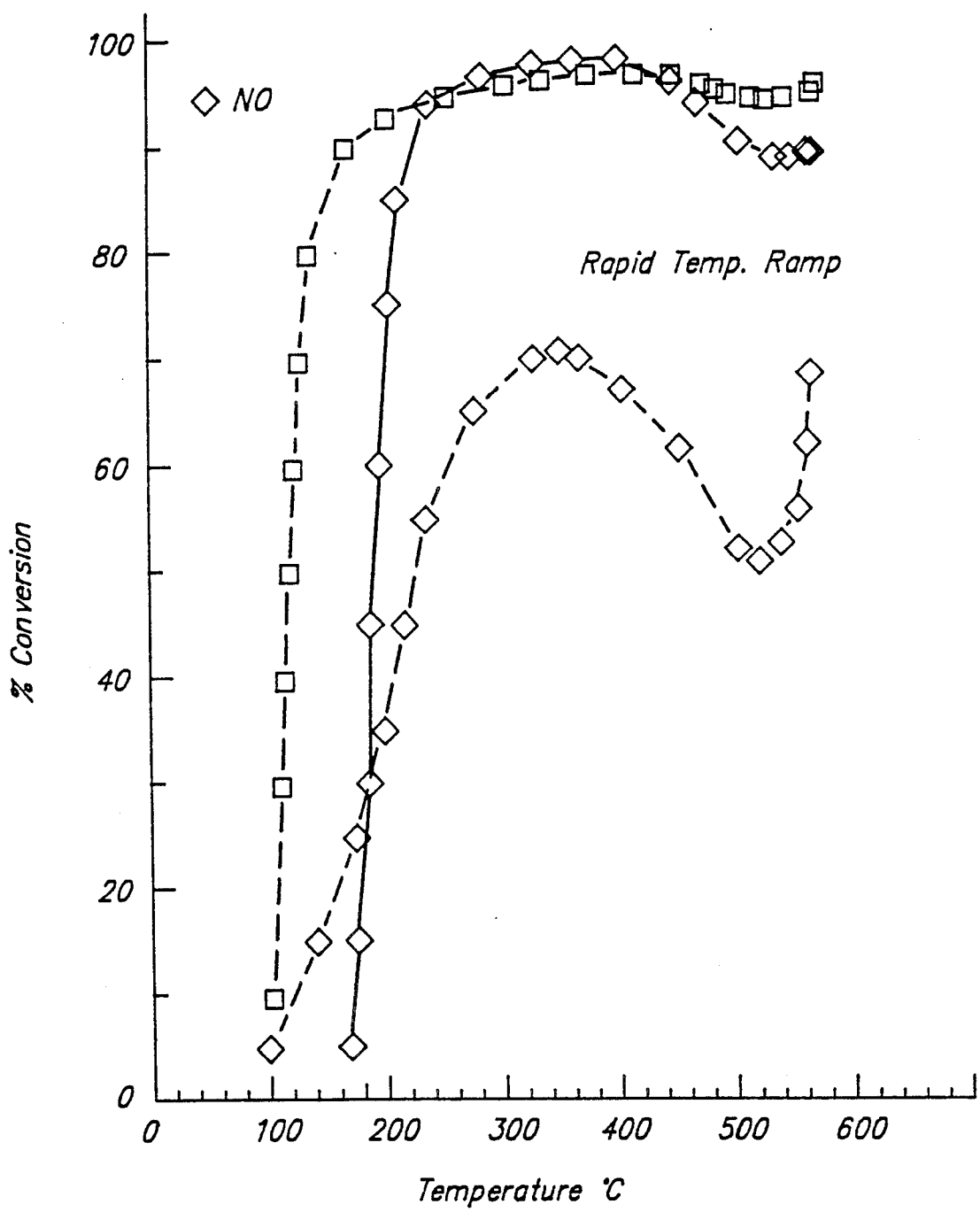
FIG. 2 is a graphical illustration of nitrogen oxide conversion efficiency plotted as a function of temperature for (i) a catalyst construction in accordance with this invention and (ii) for comparative constructions, one lacking the lanthana addition and the other lacking the lanthana/palladium/titania combination.

As shown in FIG. 2, nitric oxide reduction (conversion) efficiency is substantially greater for the catalyst of this invention (see square symbols with broken line) throughout the temperature range of 100°-600° C. as compared to the reduction capability of a palladium catalyst (see diamond symbol with solid line) without lanthana and titanium dioxide, and is substantially greater in the temperature range of 100°-200° C. and 400°-600° C. as compared to the reduction capability of a palladium catalyst with $TiO_2$, but not lanthana (see diamond symbol with broken line). As shown in FIG. 1, the conversion efficiency of oxidizing hydrocarbons is substantially greater in the temperature range of 300°-500° C. for the invention (triangular symbol with solid line: $Al_2O_3/La_2O_3/Pd/TiO_2$) than that compared for a palladium catalyst devoid of titanium dioxide (broken line: $Al_2O_3/La_2O_3/Pd$).

Thus, the unique introduction of a discontinuous phase of titania to a discontinuous palladium phase and discontinuous lanthana phase enhances the high temperature catalysis of both reduction and oxidation of nitrous oxide and hydrocarbon, and also reduces the light-off temperature for the catalyst in an amount of 20°-100° C.

To show the importance of process and chemical content variations, several samples were run and data therefor is shown in Table I.

Each of the samples was generated by impregnating gamma alumina by incipient wetness, with lanthanum nitrate solution to produce 15% lanthana/alumina composition (42.5 grams of gamma alumina, 20-40 mesh was mixed with a solution of 8.4 grams of lanthanum nitrate in 56 ml of water). It was dried overnight at 100° C. and calcined at 700° C. for 16 hours. For those samples having a discontinuous phase of palladium, 6 ml of palladium nitrate solution (83.5 g/l) was diluted to 56 ml to obtain a solution with 0.5 gram of palladium; to the solution was added the lanthana decorated alumina particles. The mixture was dried and calcined similarly. For those samples employing a discontinuous $TiO_2$ phase, a solution of 0.56 grams of titanium butoxide was prepared in 15 ml of ethanol and 5 grams of 15% lanthana/alumina composition was added to it. This latter mixture was stirred to mix it thoroughly. It was placed in an oven at 95° C. to evaporate ethanol. The titania-modified material and the starting palladium/alumina composition were heated in an oven at 280° C. for one hour and thence at 600° C. for six hours. The catalytic activity of these materials for propane oxidation and NO reduction was determined in a simulated flow reactor (1% $H_2$, 1000 ppm NO, space velocity 30 K $hr^{-1}$ for NO test, and 500 ppm $C_3H_8$, 2% $O_2$ at 30 K $hr^{-1}$ for HC test). Samples 1 and 2 compare the catalytic activity without the use of $La_2O_3$. Sample 3 compares the catalytic activity with and without the use of an organo-titanium compound. Sample 4 compares use of a non-alumina substrate. Sample 5 compares different mode of applying slurries. Sample 6 compares added presence of conventional oxides in place of lanthana. Samples 7 and 8 compare respectively the presence of added Pt and replacement of Pd by Pt. Sample 9 compares the catalytic activity utilizing a different organo-titanium compound. Sample 10 compares greater lanthana. Samples 11 and 12 compare greater and too lean contents of TiO$_2$. Sample 13, the use of rapid heating rather than stepped heating of titania.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

TABLE I

| Sample | Chemistry | Parameter Variation | Conversion Efficiency | | | |
|---|---|---|---|---|---|---|
| | | | % HC at 350° C. | % HC at 400° C. | % NO at 150° C. | % NO at 500° C. |
| 1. | Al$_2$O$_3$/15% La$_2$O$_3$/ 1% Pd/1.2% TiO$_2$ | all ingredients applied as slurries; butoxide used for discontinuous TiO$_2$ | 61 | 85 | 82 | 95 |
| 2. | Al$_2$O$_3$/0% La$_2$O$_3$/ 1% Pd/1.2% TiO$_2$ | same as 1 except lanthana not present | 57 | 82 | 15 | 89 |
| 3. | Al$_2$O$_3$/15% La$_2$O$_3$/ 1% Pd/0% TiO$_2$ | same as 1 except titania not present | 39 | 73 | 10 | 82 |
| 4. | Fe/15% La$_2$O$_3$/1% Pd/ 1.2% TiO$_2$ | same as 1 except stainless steel mesh metal is substrate or support | 62 | 86 | 81 | 93 |
| 5. | Al$_2$O$_3$/15% La$_2$O$_3$/ 1% Pd/1.2% TiO$_2$ | same as 1 except Al$_2$O$_3$ not applied as part of catalyst slurry | 60 | 85 | 83 | 95 |
| 6. | Al$_2$O$_3$/1% CeO$_2$/1% Pd/ 1.2% TiO$_2$ | same as 1 except CeO$_2$ replaces lanthana | 32 | 81 | 82 | 94 |
| 7. | Al$_2$O$_3$/15% La$_2$O$_3$/ 1% Pd/.5% Pt/.2% TiO$_2$ | same as 1 except Pt added | 65 | 89 | 84 | 95 |
| 8. | Al$_2$O$_3$/1% La$_2$O$_3$/ 1% Pt/1.2% TiO$_2$ | same as 1 except Pt replaces Pd | 59 | 86 | 73 | 84 |
| 9. | Al$_2$O$_3$/15% La$_2$O$_3$/ 1% Pd/1.2% TiO$_2$ | same as 1 except different organo-titanium compound used | 60 | 85 | 83 | 95 |
| 10. | Al$_2$O$_3$/25% La$_2$O$_3$/ 1% Pd/1.2% TiO$_2$ | greater La$_2$O$_3$ | 60 | 84 | 83 | 96 |
| 11. | Al$_2$O$_3$/15% La$_2$O$_3$/ 1% Pd/9% TiO$_2$ | excessive TiO$_2$ | 58 | 79 | 78 | 87 |
| 12. | Al$_2$O$_3$/15% La$_2$O$_3$/ 1% Pd/.05% TiO$_2$ | deficient TiO$_2$ | 59 | 83 | 47 | 91 |
| 13. | Al$_2$O$_3$/15% La$_2$O$_3$/ 1% Pd/1.2% TiO$_2$ | rapid rather than stepped heating of titania slurry | 60 | 84 | 80 | 92 |

What is claimed is:

1. A three-way catalyst for automotive emission control, comprising:
    (a) a mechanical carrier having a support comprised substantially of alumina;
    (b) discontinuous lanthanum oxide on said support;
    (c) a catalytic palladium compound supported discontinuously on the decorated support having a major constituent of palladium; and
    (d) a discontinuous phase of titanium oxide on said alumina, lanthana, and catalytic compound composite, said titanium oxide being 0.1–8.0% by weight of the total weight of the catalyst.

2. The catalyst as in claim 1, in which said discontinuous palladium compound covers 0.05–10% of said lanthana decorated support.

3. The catalyst as in claim 1, characterized by a conversion efficiency of HC at 350° C. of at least 60 and at 400° C. of at least 84, and a conversion efficiency of NO at 150° C. of at least 80 and at 500° C. of at least 92.

4. The catalyst as in claim 1, in which said discontinuous titania phase is a washcoat constituting 0.1% up to 8% of the total weight of the catalyst.

5. The catalyst as in claim 4, in which said catalytic palladium compound forms 0.05–5% of the total weight of the catalyst.

6. The catalyst as in claim 1, in which said discontinuous titania phase is 0.1–2.0% of the total weight of the catalyst.

7. The catalyst as in claim 1, in which said catalytic compound contains up to 2.5% platinum.

8. The catalyst as in claim 1, in which no greater than 40% of the surface area of each exposed particle of catalytic compound or decorated support is covered by said titanium oxide phase.

9. A method of making a three-way catalyst for automotive emission control, comprising:
    (a) discontinuously coating an alumina support with lanthana;
    (b) impregnating the coated support with a palladium compound to form a discontinuous phase on the lanthana and support; and
    (c) impregnating the coated support and catalytic compound with an organo-titanium compound to form, upon heating, a discontinuous titanium oxide phase on the exposed portions of said discontinuous lanthana and palladium compound phases, said compound being present in an amount of 0.1–8% by weight of the catalyst.

10. The method as in claim 9, in which palladium is added in a diluted palladium nitrate solution with the amount of acid being regulated to a pH of 3–5, and after drying the support wetted with said acid, calcining the composite at a temperature in the range of 450°–650° C.

11. The method as in claim 9, in which said organo-titanium compound is dissolved in a liquid for wetting said composite, said wetted composite being calcined at a temperature of 400°-600° C. for 4-12 hours.

12. The method as in claim 11, in which said calcination is staged to include heating to 250°-280° C. for 1-½ to 2-½ hours, and thence heating to 400°-600° C. for 5-10 hours.

13. The method as in claim 9, in which said support is a collection of aggregates prepared by (i) wetting a particulate source of alumina with dilute nitric acid to form a slurry, (ii) drying said slurry to form a cake, and (iii) crushing said cake to an average particle size of 25-40 mesh.

14. The method as in claim 9, in which said organo-titanium compound is titanium butoxide.

* * * * *